No. 872,183. PATENTED NOV. 26, 1907.
G. A. JENNING.
LEVELING INSTRUMENT.
APPLICATION FILED MAR. 19, 1907.

2 SHEETS—SHEET 1.

ATTEST.
H. G. Fletcher.
M. P. Smith.

INVENTOR
GUSTAV A. JENNING.
BY Higdon & Longan
ATTY'S

THE NORRIS PETERS CO., WASHINGTON, D. C.

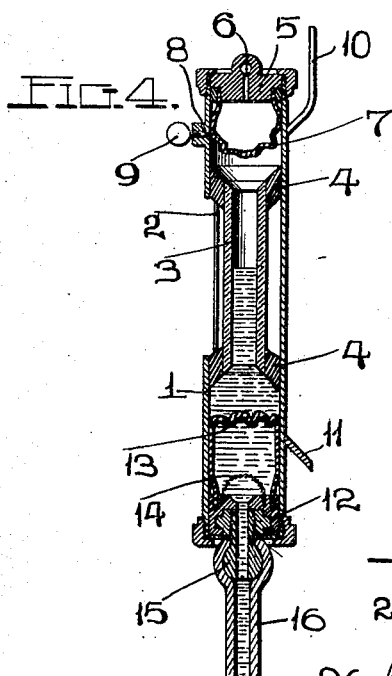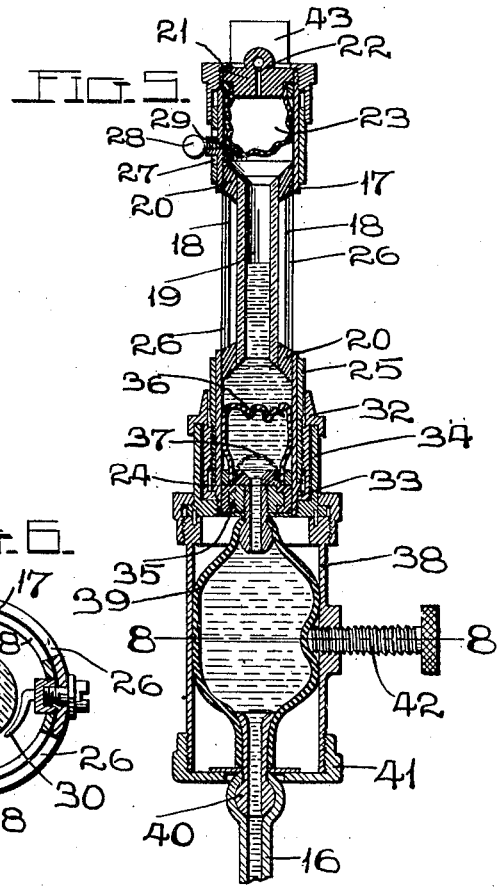

UNITED STATES PATENT OFFICE.

GUSTAV A. JENNING, OF EAST ST. LOUIS, ILLINOIS.

LEVELING INSTRUMENT.

No. 872,183.  Specification of Letters Patent.  Patented Nov. 26, 1907.

Application filed March 19, 1907. Serial No. 363,287.

*To all whom it may concern:*

Be it known that I, GUSTAV A. JENNING, a citizen of the United States, and a resident of East St. Louis, Illinois, have invented certain new and useful Improvements in Leveling Instruments, of which the following is a specification containing a full, clear, and exact description, reference being had to the accompanying drawings, forming a part hereof.

My invention relates to a leveling instrument particularly adapted for ascertaining a point or points in a horizontal plane to correspond with a fixed or known point in said horizontal plane, and my improved instrument is particularly intended for use where the operator at one end of the instrument is hid from view of the operator at the opposite end; and can be advantageously used for ascertaining corresponding points in a horizontal plane in surveying and in all building operations, including excavations, mines, submarine work, and the like.

The object of my invention is to provide a simple, compact, and portable instrument utilizing a length of flexible tubing, and the ends of which are provided with devices which, together with the flexible tubing, are filled with fluid, and the level or surface of which fluid is exposed for view through transparent tubes arranged in the devices at the ends of the flexible tube.

To the above purposes, my invention consists in certain novel features of construction and arrangement of parts, which will be hereinafter more fully set forth, pointed out in the claims, and illustrated in the accompanying drawings, in which:—

Figure 1:
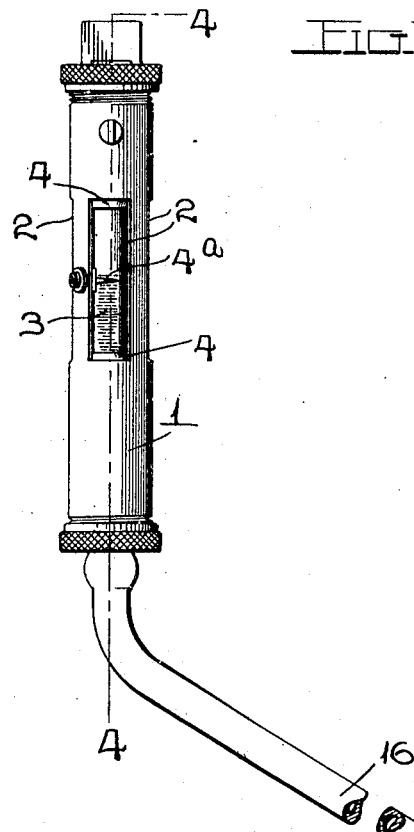
Figure 1:
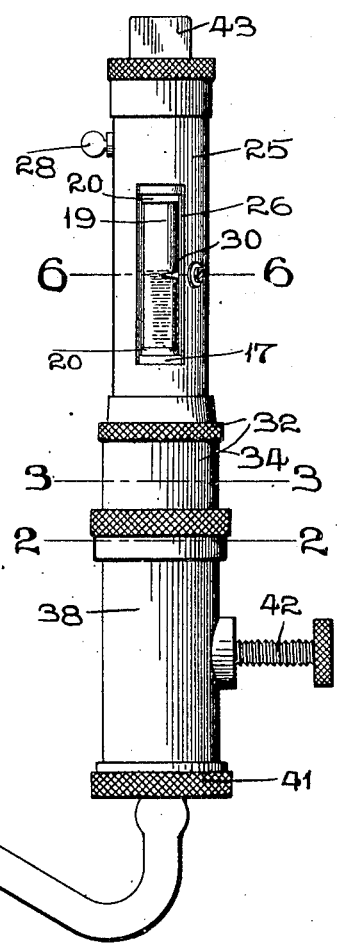
Figure 2:
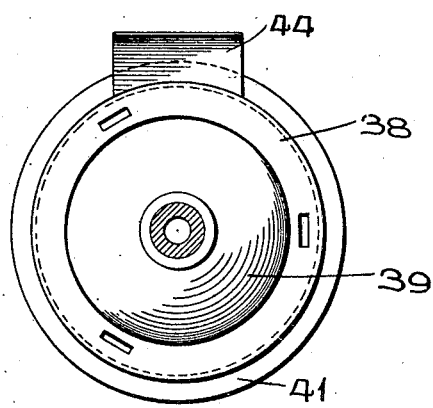
Figure 3:
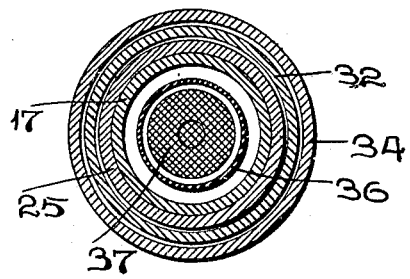

Figure 1 is an elevation of my improved instrument, a portion of the flexible tube being broken away; Fig. 2 is an enlarged horizontal section taken approximately on the line 2—2 of Fig. 1; Fig. 3 is an enlarged horizontal section taken on the line 3—3 of Fig. 1; Fig. 4 is a vertical section taken on the line 4—4 of Fig. 1; Fig. 5 is a vertical section taken through the center of the device at the end of the instrument shown at the right hand of Fig. 1; Fig. 6 is an enlarged horizontal section taken on the line 6—6 of Fig. 1; Fig. 7 is an elevation, partly in section, of the device seen in Fig. 5; Fig. 8 is an enlarged horizontal section taken on the line 8—8 of Fig. 5.

The device at the end of the instrument, which is positioned at the known or fixed elevation, comprises the tube 1, in which is formed a plurality of vertically disposed sight openings 2, and vertically disposed within the tube, opposite these sight openings, is a transparent tube 3, held at its ends by collars 4, which are fixed in any suitable manner within the tube.

Fixed on one of the ribs between the sight openings 2 is a pointer $4^a$, the end of which terminates adjacent the surface of the transparent tube, at a point approximately midway between its ends.

A plug 5 closes the upper end of the tube 1, through the center of which plug is formed an air inlet 6, and carried by said plug and partially filling the space within the tube 1, above the upper end of the tube 3, is a collapsible sack 7.

Formed through the tube 1, above the upper end of the tube 3, is an air inlet port 8, normally closed by a valve 9, and which is for the purpose of permitting air to enter the upper end of the tubes 1 and 3.

Fixed to the rear side of the tube 1 and extending upwardly therefrom is a finger 10, and fixed to the lower portion of said tube 1, and projecting rearwardly therefrom, is a finger 11, the outer end of which is in vertical alinement with the rear side of said finger 10.

Removably positioned in the lower end of the tube 1 is a tubular plug 12, which carries a collapsible sack 13, which occupies the chamber in the lower end of the tube 1 beneath the tube 3; and fixed to the top of the plug 12, within the collapsible sack 13 and over the passageway through said plug is a screen 14, which serves as a guard to prevent the collapsible sack from being drawn into the passageway through the plug. Formed integral with the lower end of the tubular plug 12 is a stem 15, on which is removably arranged one end of a flexible tube 16, which may be of any desired length.

The device which is arranged at the end of the flexible tube 16, opposite the device just described, comprises a tube 17, in which is formed a series of vertically disposed openings 18, through which is exposed for view a transparent tube 19, held within said tube 17 by means of collars 20.

Normally closing the upper end of this tube 17 is a plug 21, through which is formed an air inlet aperture 22, and which plug is provided with a collapsible sack 23, which occupies a portion of the space in the tube 17 above the tube 19. The lower end of the tube 17 is exteriorly screw threaded, and formed on said tube, just above the screw threaded portion, is a flange 24.

Arranged to slide freely upon the tube 17 is a sleeve 25, which is provided with sight openings 26, corresponding to the openings 18; and formed through the upper portion of this sleeve 25 is a slot 27, through which extends a lug carried by the tube 17, and in which is located a valve 28 normally closing an air inlet port 29 leading to the interior of said tube 17 below the collapsible sack 23.

Fixed to one of the webs between the openings 26 of the sleeve 25 is an indicator finger 30, the point of which terminates adjacent the surface of the tube 19, and said finger passes through a slot 31 formed in the corresponding one of the webs between the openings 18 in the tube 17.

The lower end of the sleeve 25 is adapted to engage on the flange 24, and the lower portion of said sleeve is exteriorly screw threaded, and arranged on said screw threaded portion is a collar 32, the lower end of which is provided with an inwardly projecting flange 33, which engages beneath the flange 24; and screw seated upon the lower end of the tube 17 is a collar 34, which incloses the lower portion of the collar 32.

Removably positioned in the lower end of the tube 17 is a tubular plug 35, which carries a collapsible sack 36, which latter occupies the chamber in the lower end of said tube 17 below the tube 19, and arranged over the opening through the tubular plug 35 is a screen 37 which acts as a guard to prevent the collapsible sack 36 from being drawn into the aperture through the tubular plug 35.

Detachably connected to the collar 34 is a tubular member 38, and located therein and connected to an extension on the tubular plug 35 is a collapsible sack or bulb 39, the lower end of which is provided with a tubular stem 40 which projects through a cap 41 closing the lower end of the member 38, and said stem being connected to the flexible tube 16. Operating through the side of the tubular member 38 is a screw 42, the end of which bears against the collapsible bulb 39. Fixed to the rear side of the sleeve 25 and projecting upwardly therefrom is a finger 43, which corresponds to the finger 10, (previously described,) and fixed to the lower portion of the sleeve 38 and projecting outwardly therefrom is a finger 44, the outer end of which is in vertical alinement with the rear side of said finger 43.

The tube 16 and the collapsible bulb 39 are completely filled with a suitable fluid, such as water, or diluted alcohol, and the collapsible sacks 13 and 36 are partially filled with said fluid; and the chambers in the lower ends of the tubes 1 and 17, above the collapsible sacks 13 and 36, are filled with the fluid, which also partially fills the tubes 3 and 19; and when the tops of said tubes occupy the same horizontal plane, the level of the two bodies of fluid is readily discernible through said tubes, and the water level in the tube 3 coincides with the pointer 4$^a$.

Air, at the normal atmospheric pressure, is introduced into the chambers in the upper ends of the tubes 1 and 17, and in the upper ends of the tubes 3 and 19, through the inlets 8 and 29, after which the valves 9 and 28 are closed, and air, at the normal atmospheric pressure, enters the collapsible sacks 7 and 23 through the inlets 6 and 22.

To ascertain a point in a vertical plane after a fixed point has been established, the tube 1 is vertically disposed, with the upper end of the finger 10 at the known or given point, and an operator now takes the tube 17 and parts carried thereby and carries the same to the location where it is desired to establish a point in the same horizontal plane with the point occupied by the upper end of the finger 10, and, owing to the employment of the flexible tube 16, said tube 17 and parts carried thereby can be carried over a wall or like obstruction in a building, or through passageways of mines or excavations, and the like, to the point where it is desired to ascertain the desired level, and said tube 17 is then shifted vertically until the fluid is discernible through the sight openings and transparent tube 19; and to bring the upper end of the finger 43 to the exact point or in perfect horizontal alinement with the upper end of the finger 10, the operator holding the tube 17, manipulates the collar 32 upon the screw threaded portion of the sleeve 25 so as to elevate or lower said sleeve to bring the pointer 30 into horizontal alinement with the level of the fluid in the tube 19; and, when this has been accomplished, the upper end of the finger 43 marks the desired point which is in exact horizontal alinement with the upper end of the finger 10.

The natural law of fluid seeking its level is employed in my improved instrument, and as the device, comprising the tube 17 and parts carried thereby, is shifted vertically in ascertaining the desired point, the fluid in the tube 16 and bulb 39 will freely flow from one direction to another, correspondingly filling or collapsing the sacks 13 and 36; and the movement of said sacks correspondingly changes the level of the bodies of fluid within the tubes 3 and 19. As the fluid rises and falls in said tubes, the air in the chambers in the upper portions of said tubes, and in the upper portions of the tubes 1 and 17, causes a corresponding collapse and inflation of the sacks 7 and 23, and the air contained in said last mentioned sacks finds ingress and egress through the apertures 6 and 22. The sacks 7 and 23 prevent the air contained in the chambers in the upper ends of the tubes 1 and 17 from discharging through the apertures 6 and 22, and the collapsible sacks 13 and 36 prevent air from entering the tube 16 when the devices at the ends of said tube are inverted.

The guard screens 14 and 37 prevent the collapsible sacks 13 and 36 from being drawn into the apertures through the tubular plugs 12 and 35 while the device is in use, and the screw 42, bearing on the collapsible bulb 39, regulates the height of the fluid columns in the tubes 3 and 19, and also compensates for any expansion or contraction of the fluid in the flexible tube.

A leveling instrument of my improved construction is very simple, easily operated and adjusted, and provides an efficient and accurate device for readily obtaining corresponding points in a horizontal plane where instruments usually employed for such purpose are unavailable.

I claim:—

1. A leveling instrument constructed with a pair of tubes, transparent tubes arranged within the first mentioned tubes, a flexible tube connecting the lower ends of the first mentioned tubes, collapsible sacks arranged in the lower ends of the first mentioned tubes, which flexible tube is filled with fluid, and the transparent tubes and collapsible sacks being partially filled with fluid.

2. A leveling instrument, constructed with a pair of tubes, transparent tubes arranged within the first mentioned tubes, a flexible tube connecting the lower ends of the first mentioned tubes, collapsible sacks arranged in the lower ends of the first mentioned tubes, which flexible tube is filled with fluid, the transparent tubes and collapsible sacks being partially filled with fluid, and means arranged in the upper ends of the first mentioned tubes for preventing the discharge of the fluid from the transparent tubes through the upper ends of the first mentioned tubes.

3. A leveling instrument, constructed with a pair of transparent tubes, a flexible tube, means whereby the ends of the flexible tube are connected to the transparent tubes, collapsible sacks arranged in the connections between the flexible tube and the transparent tubes, which flexible tube is filled with fluid, and which transparent tubes and collapsible sacks are partially filled with fluid.

4. A leveling instrument, constructed with a pair of transparent tubes, a flexible tube, means whereby the ends of the flexible tube are connected to the transparent tubes, collapsible sacks arranged in the connections between the flexible tube and the transparent tubes, which flexible tube is filled with fluid, which transparent tubes and collapsible sacks are partially filled with fluid, and means whereby the level of the fluid in the transparent tubes is adjustable.

5. A leveling instrument, constructed with a pair of tubes, a flexible tube connecting the lower ends of said tubes, the lower ends of said tubes and the flexible tube being filled with fluid, transparent tubes arranged in the first mentioned tubes, which transparent tubes are partially filled with fluid, means whereby the level of the fluid in the transparent tubes is regulated, caps normally closing the upper ends of the first mentioned tubes, and means carried by said caps for preventing the discharge of air and fluid from the upper ends of the first mentioned tubes and the transparent tubes.

In testimony whereof, I have signed my name to this specification, in presence of two subscribing witnesses.

GUSTAV A. JENNING.

Witnesses:
M. P. SMITH,
E. L. WALLACE.